(12) United States Patent
White

(10) Patent No.: US 10,286,728 B2
(45) Date of Patent: May 14, 2019

(54) HEAVY-DUTY VEHICLE WHEEL HUB LUBRICANT FILL PORT

(71) Applicant: HENDRICKSON USA, L.L.C., Itasca, IL (US)

(72) Inventor: Jay D. White, Massillon, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 343 days.

(21) Appl. No.: 15/333,307

(22) Filed: Oct. 25, 2016

(65) Prior Publication Data
US 2017/0120674 A1    May 4, 2017

Related U.S. Application Data

(60) Provisional application No. 62/247,814, filed on Oct. 29, 2015.

(51) Int. Cl.
*B60B 27/02* (2006.01)
*B60B 27/00* (2006.01)
*F16C 33/66* (2006.01)

(52) U.S. Cl.
CPC .......... *B60B 27/02* (2013.01); *B60B 27/0047* (2013.01); *F16C 33/6622* (2013.01); *B60B 2380/00* (2013.01); *B60B 2900/541* (2013.01); *B60B 2900/561* (2013.01); *B60Y 2200/14* (2013.01); *B60Y 2200/22* (2013.01)

(58) Field of Classification Search
CPC .... B60B 27/00; B60B 27/0005; B60B 27/001
See application file for complete search history.

(56) References Cited

U.S. PATENT DOCUMENTS

| 1,823,422 A | 9/1931 | Bock |
| 2,249,501 A | 7/1941 | Teker |
| 2,280,755 A | 4/1942 | Hexamer |
| 2,337,403 A | 12/1943 | Myers et al. |
| 2,504,094 A | 4/1950 | Turner et al. |
| 2,723,168 A | 11/1955 | Carroll |
| 3,231,317 A | 1/1966 | Dudar |
| 3,642,327 A | 2/1972 | Walther |
| 3,903,992 A | 9/1975 | Chivukula et al. |

(Continued)

FOREIGN PATENT DOCUMENTS

| EP | 0521719 B1 | 10/1995 |
| KR | 20040051629 A | 6/2004 |
| WO | 9832618 A1 | 7/1998 |

*Primary Examiner* — Jason R Bellinger
(74) *Attorney, Agent, or Firm* — Dureska & Moore, LLC; David P. Dureska; David J. Danko

(57) ABSTRACT

An axle depends from a heavy-duty vehicle. Each one of a pair of wheel end assemblies is mounted on a respective one of the ends of the axle. Each wheel end assembly includes a pair of bearings mounted on a spindle of the axle, and a wheel hub rotatably mounted on the bearings. A cavity is formed in the wheel end assembly between the bearings. A port is formed in the wheel hub and extends axially inwardly from an outboard end to a lubricant cavity of the hub, and angles radially inwardly from the outboard end to the lubricant cavity at an angle relative to an axial centerline of the hub. Lubricant for the bearings is introduced into the cavity by means of the port, and the port is tapped to receive a plug to seal it and contain the lubricant in the cavity. The port also provides a visual indicator if there is a leakage of semi-fluid grease.

14 Claims, 4 Drawing Sheets

(56) References Cited

U.S. PATENT DOCUMENTS

| | | | |
|---|---|---|---|
| 3,917,362 | A | 11/1975 | Stedman |
| 3,932,006 | A | 1/1976 | Tertinek et al. |
| 4,027,743 | A | 6/1977 | Deller et al. |
| 4,636,007 | A | 1/1987 | Persons |
| 4,883,368 | A | 11/1989 | Stein |
| 5,174,839 | A | 12/1992 | Schultz et al. |
| 5,322,373 | A | 6/1994 | Oakes et al. |
| 5,658,053 | A | 8/1997 | Vencill et al. |
| 6,203,114 | B1 | 3/2001 | Ehrlich |
| 7,585,031 | B2 | 9/2009 | White et al. |
| 2008/0023270 | A1 | 1/2008 | White et al. |
| 2008/0024003 | A1 | 1/2008 | White et al. |

HEAVY-DUTY VEHICLE WHEEL HUB LUBRICANT FILL PORT

CROSS-REFERENCE TO RELATED APPLICATION

This application claims the benefit of U.S. Provisional Patent Application Ser. No. 62/247,814, filed Oct. 29, 2015.

BACKGROUND OF THE INVENTION

Field of the Invention

The invention relates to wheel end assemblies, and in particular to wheel end assemblies for drive or non-drive steerable or non-steerable axles of heavy-duty vehicles, such as trucks, tractors, semi-trailers, or trailers. More particularly, the invention is directed to a drive or non-drive steerable or non-steerable axle wheel hub of a heavy-duty vehicle wheel end assembly, in which the wheel hub includes a lubricant fill port that extends axially inboardly and radially inwardly from an outboard surface of the wheel hub to a wheel hub lubricant cavity at a predetermined angle, thereby facilitating filling and re-filling of the wheel hub lubricant cavity with semi-fluid grease.

Background Art

For many years, the heavy-duty vehicle industry has utilized wheel end assemblies which typically are mounted on each end of one or more drive or non-drive steerable or non-steerable axles. Each wheel end assembly typically includes a hub rotatably mounted on a bearing assembly, which includes an inboard bearing and an outboard bearing, which in turn are immovably mounted on the outboard end of the axle, commonly known as an axle spindle. As is well known to those skilled in the art, for normal operation of the wheel end assembly to occur, the bearing assembly and surrounding components must be lubricated with oil or grease. Therefore, the wheel end assembly must be sealed to prevent leakage of the lubricant, and also to prevent contaminants from entering the assembly, both of which could be detrimental to its performance. More specifically, a hubcap is mounted on an outboard end of the wheel hub, and a main seal is rotatably mounted on an inboard end of the hub and the bearing assembly in abutment with the axle spindle, resulting in a closed or sealed wheel end assembly.

On drive or non-drive axles, such as truck, tractor or trailer axles, it is desirable to retain a predetermined amount of lubricant in the wheel end assembly, which increases the life of the bearing assembly, in turn reducing the cost of maintaining and/or replacing the bearing assembly. Historically, oil has been used as the lubricant for the bearing assemblies, but it may not be the optimum lubricant for achieving the goal of increased bearing assembly life. More particularly, if the main seal on the wheel hub assembly degrades, there is a tendency for the oil to leak out of the assembly due to its relatively low viscosity in comparison to other lubricants. When oil leaks out, the bearing assembly may become under-lubricated, which reduces its life. In addition, in the event of such an oil leak, the main seal usually must be repaired or replaced. Moreover, when the oil leaks out of the wheel end assembly, it may leak onto components of an associated brake system, such as the brake shoes, which must then be repaired, thereby increasing the cost associated with an oil leak. Such potential disadvantages associated with oil leaks have led to increasing use of semi-fluid grease as a replacement for oil as a lubricant for bearing assemblies in wheel end assemblies on drive or non-drive axles.

The higher viscosity of semi-fluid grease causes it to flow less readily than oil, which is an advantage in reducing potential leaks, but creates the need for alternative methods of filling the wheel end assembly with lubricant. That is, with oil, a hole typically is provided in the hubcap, enabling the oil to be poured into the sealed wheel end assembly through the hubcap according to methods that are known in the art. However, semi-fluid grease does not readily flow to both the inboard and outboard bearings and the hub area proximate the bearings using such a hubcap fill hole. Thus, various prior art methods have been developed for filling the wheel end assembly with the proper amount of semi-fluid grease and/or other types of lubricant.

Most of the prior art methods for filling the wheel end assembly with semi-fluid grease are associated with non-steerable axles. For example, one prior art method involves mounting only the inboard bearing of the bearing assembly on the axle spindle prior to adding semi-fluid grease to the wheel hub. In the prior art method, the inboard bearing is mounted on the axle spindle, and the wheel hub is mounted on the inboard bearing without the outboard bearing and without a retaining nut, the latter of which typically is used to secure the position of the bearings and the hub on the axle spindle. A nozzle is inserted in the gap between the axle spindle and the hub, and a premeasured amount of semi-fluid grease is pumped into the gap against the inboard bearing. Once the grease has been added, the outboard bearing is mounted on the axle spindle and the retaining nut is installed and tightened onto the axle spindle.

This method includes a distinct disadvantage, since the lack of the installation of the outer bearing during grease introduction requires that an operator maintain a relatively horizontal position of the wheel hub to prevent damaging the main seal of the wheel end assembly. That is, without the outboard bearing in place, there is a tendency for the outboard end of the wheel hub to drop down onto the axle spindle, which in turn can kink or damage the main seal at the inboard end of the wheel hub. In addition, while this prior art method may be employed somewhat efficiently during initial assembly of the wheel end assembly with factory-trained assemblers, it is much less practical for use in the field, such as during servicing of the wheel end assembly, since the wheel end assembly would have to be at least partially disassembled just to add lubricant. As is well-known in the art, it is desirable for lubrication of a wheel end assembly in the field to be performed with minimal disassembly.

Another prior art method involves a wheel hub that includes a radially-oriented fill port that is formed in the hub wall between the inboard and outboard bearings, and pumping a premeasured amount of semi-fluid grease into the wheel end assembly through this port. After the lubricant is added, a threaded plug is installed in the port to prevent the lubricant from exiting the wheel hub during service. More particularly, the plug may include a pipe-style interfering thread, or may include a standard thread that compresses an O-ring, which seals the port. This method is preferred over the above-described first prior art method, because the main seal and bearing assembly can be installed with proper alignment before the lubricant is added, so that the main seal typically is not subject to damage during the grease fill operation.

The radially-oriented fill port design is well-known in the art for non-drive, non-steerable axles, and is relatively simple to manufacture, as long as the wall of the wheel hub has a sufficient thickness to allow an adequate number of threads to be formed to secure the above-described threaded plug in the port. However, when high-strength, thin-wall axle wheel hub constructions are employed, a radially-oriented fill port formed in the wall of the wheel hub is not practical, since there may not be enough wall thickness in such a wheel hub to form adequate threads to secure a threaded plug. In addition, the formation of the radially-oriented port involves an additional manufacturing operation, which undesirably increases the cost of the wheel hub.

Still another prior art structure and method of adding lubricant to a wheel end assembly exists, but this structure and method applies only to drive axles, rather than non-drive axles. More specifically, in order to transmit drive torque to a drive wheel, a drive axle and wheel end assembly typically includes a rotating drive shaft that extends through a non-rotating axle spindle. A wheel hub is rotatably mounted on the axle spindle via a bearing assembly, and a set of axially-oriented holes are formed in the outboard end of the wheel hub. The drive shaft is connected at its outboard end to an outboard plate or flange, in which holes are formed that align with the holes in the wheel hub. Drive studs extend through the holes in the plate and into the aligned holes in the wheel hub, where they are seated with an interference fit. In this manner, drive torque from the drive axle is transferred through the plate to the drive studs and to the wheel hub, which rotates about the axle spindle on the bearing assembly for turning the vehicle wheels.

In the prior art lubrication method for such a drive-axle wheel end assembly, one of the holes in the wheel hub, which typically is of a fairly large diameter, is drilled further inboardly until it breaks into a cavity formed in the wheel hub between the inboard and outboard bearings. Oil-type lubricant then is introduced into the wheel hub cavity, which enables the lubricant to reach the bearings. Once the proper amount of oil is added, the interference-fit drive stud is installed into the wheel hub, and a nut is installed on the outboard end of the stud to secure the connection of the plate to the wheel hub. However, this method cannot be used on wheel end assemblies for non-drive axles, since such wheel end assemblies lack the structure of drive-axle wheel hubs, and in particular, the outboard plate drive stud assembly, and associated holes formed in the wheel hub. In addition, as described above, this prior art method utilizes oil as the lubricant, rather than semi-fluid grease.

Yet another prior art method is known for filling a wheel end assembly of a non-drive non-steerable axle with semi-fluid grease. The prior art method is of the type described and shown in U.S. Pat. No. 7,585,031, and assigned to the Applicant of the present invention, Hendrickson U.S.A. L.L.C. In that method, a non-steerable axle wheel hub includes an axially-aligned fill port that extends from a hubcap bolt opening into the lubricant cavity. Semi-fluid grease is introduced into the lubricant cavity through the axially-aligned port, and the port is then sealed with a threaded internal plug and the hubcap bolt. Such a method and structure cannot be employed with a steerable axle wheel hub due to the structural differences between a steerable axle wheel hub and a non-steerable axle wheel hub. For example, the hubcap bolt openings in many steerable axle wheel hubs do not axially align with the lubricant cavity. In addition, there are significant space constraints on a steerable axle wheel hub that limit the formation of a lubricant fill port when compared to a non-steerable axle wheel hub.

As a result, there is a need in the art for a structure and a method for filling a steerable or non-steerable drive or non-drive axle wheel hub of a heavy-duty wheel end assembly with semi-fluid grease, which overcomes the above-described disadvantages. The axle wheel hub of a heavy-duty wheel end assembly with lubricant fill port of the present invention satisfies this need.

SUMMARY OF THE INVENTION

An objective of the present invention includes providing an axle wheel hub that is capable of being filled with semi-fluid grease without removing the outboard bearing.

Another objective of the present invention is to provide an axle wheel hub that is capable of being filled with semi-fluid grease in a simple manner, and which is economical to manufacture.

Still another objective of the present invention is to provide an axle wheel hub that provides a visual indicator if there is leakage of semi-fluid grease.

These objectives and advantages are obtained by the improved wheel hub of the present invention. In an exemplary embodiment of the invention, a wheel end assembly includes the improved wheel hub, and a pair of bearings mounted on a spindle of an axle of a heavy-duty vehicle. The improved wheel hub is rotatably mounted on the bearings and a cavity is formed in the wheel end assembly adjacent the bearings. The improved wheel hub includes a port formed in the improved wheel hub and the port extends axially inboardly and radially inwardly from an outboard surface of the improved wheel hub to the cavity at a predetermined angle to facilitate filling and re-filling of the cavity with semi-fluid grease. A plug is disposed in the port of the improved wheel hub.

These objectives and others are also obtained by the method for introducing semi-fluid grease into a wheel end assembly mounted on an axle of a heavy-duty vehicle of the present invention. In an exemplary embodiment, the method includes providing a wheel end assembly. The wheel end assembly includes an improved wheel hub and a pair of bearings mounted on a spindle of the axle. The improved wheel hub is rotatably mounted on the bearings and a cavity is formed in the wheel end assembly adjacent the bearings. A port is formed in the improved wheel hub and extends axially inboardly and radially inwardly from an outboard surface of the improved wheel hub to the cavity at a predetermined angle. A nozzle is inserted into the port to be in fluid communication with a source of semi-fluid grease. The semi-fluid grease is caused to flow through the nozzle and into the port, then in turn, into the wheel end assembly cavity. The flow of the semi-fluid grease is terminated when a predetermined amount of the semi-fluid grease has been introduced in to the wheel end assembly. A plug is disposed in the port after the flow of the semi-fluid grease has been terminated.

BRIEF DESCRIPTION OF THE SEVERAL VIEWS OF THE DRAWINGS

The preferred embodiment of the present invention, illustrative of the best mode in which applicants have contemplated applying the principles, is set forth in the following description and is shown in the drawings, and is particularly and distinctly pointed out and set forth in the appended claims.

Similar numerals refer to similar parts throughout the drawings.

DESCRIPTION OF THE PREFERRED EMBODIMENT

Figure 1:
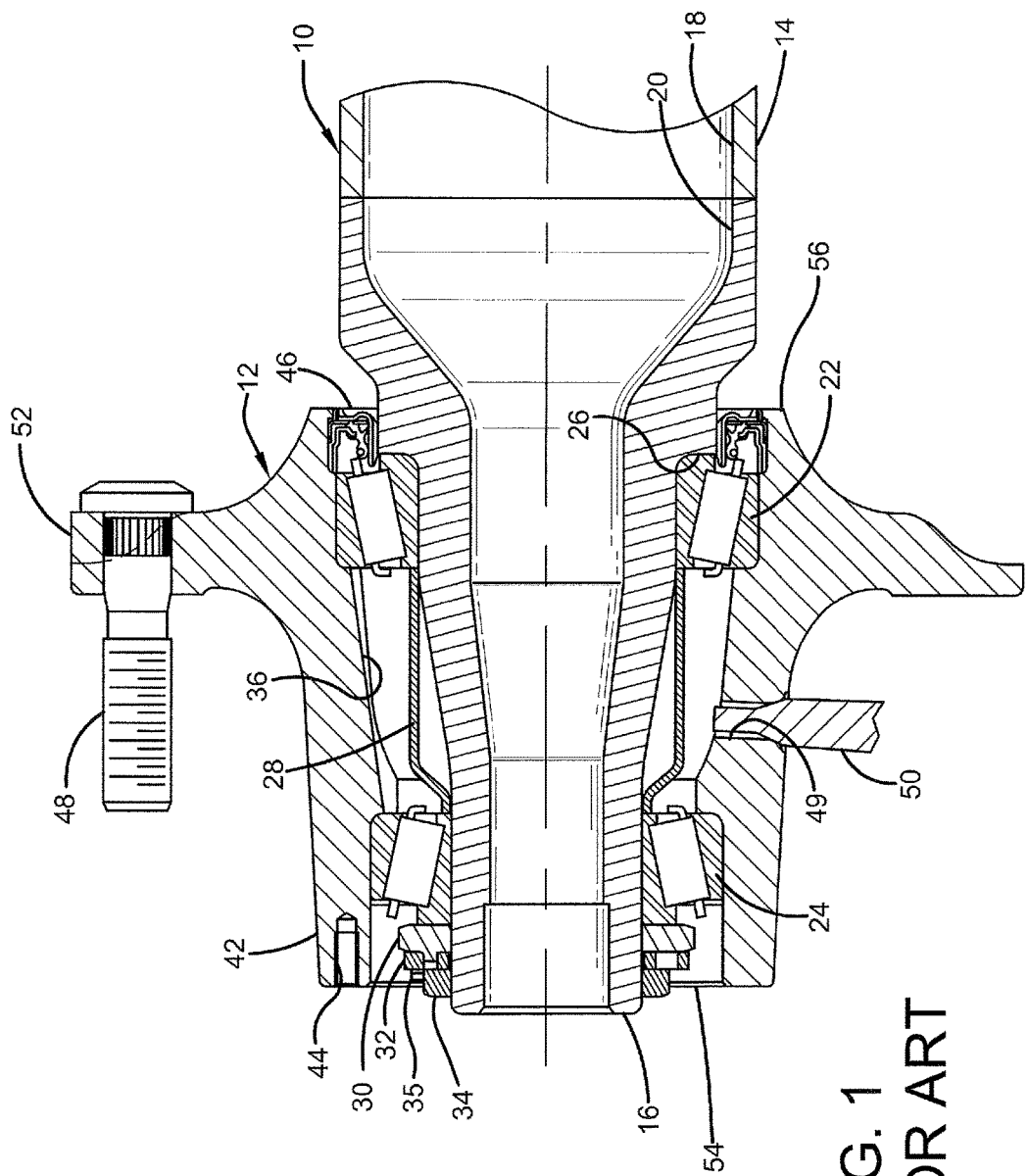
FIG. 1 is fragmentary longitudinal cross-sectional view of a portion of a first prior art non-steerable axle and an axle spindle and wheel end assembly, including a prior art wheel hub formed with a radially-oriented lubricant fill port, and showing a device inserted in the fill port for introducing semi-fluid grease into the wheel end assembly.

In order to better understand the wheel hub of the present invention, a first prior art non-drive non-steerable axle wheel hub is shown incorporated into a non-steerable axle spindle and wheel end assembly for a heavy-duty vehicle in FIG. 1, and now will be described. Non-steerable axle 10 depends from and extends transversely across the trailer of a heavy-duty tractor-trailer (not shown). A typical heavy-duty tractor-trailer includes one or more axles 10 suspended from the trailer, with each of the axles having a wheel end assembly 12 mounted on each end of the axle. For the sake of clarity, only one axle end and wheel end assembly 12 will be described herein. Axle 10 includes a central tube 14, and an axle spindle 16 is integrally connected by any suitable means, such as welding, to each end of the central tube. Axle central tube 14 generally is tubular-shaped and is formed with an internal cavity 18. Axle spindle 16 is tapered and is formed with a correspondingly tapered internal cavity 20.

Wheel end assembly 12 includes a bearing assembly having an inboard bearing 22 and an outboard bearing 24 immovably mounted on the outboard end of axle spindle 16. That is, inboard bearing 22 is mounted on the outer diameter of axle spindle 16 with its inboard surface in abutment with a shoulder 26 formed on the axle spindle. Outboard bearing 24 is mounted on axle spindle 16 near the outboard end of the axle spindle, and thereby includes a smaller inner diameter than inboard bearing 22 due to the taper of the axle spindle.

A wheel hub 42 is rotatably mounted on inboard and outboard bearings 22, 24 in a manner well known to those skilled in the art. A cavity 36 is defined in wheel hub 42 between inboard and outboard bearings 22, 24 and axle spindle 16. A correspondingly-tapered bearing spacer 28 optionally is disposed between bearings 22, 24 in cavity 36 to conveniently maintain proper spacing between the bearings. A nut assembly, which includes an inboard nut 30, a lock washer 32, an outboard nut 34, and a set screw 35, threadably engages the outboard end of axle spindle 16 and secures bearings 22, 24 and bearing spacer 28 in place.

A hubcap (not shown) is mounted on the outboard end of hub 42 by a plurality of bolts that each pass through a respective one of a plurality of openings formed in the hubcap, and threadably engage a respective one of a plurality of aligned threaded openings 44 formed in the hub. In this manner, the hubcap closes the outboard end of wheel end assembly 12. A main continuous seal 46 is rotatably mounted on the inboard end of wheel end assembly 12 and closes the inboard end of the assembly. More particularly, seal 46 is mounted on wheel end assembly 12 in a suitable manner and radially bridges hub 42 and axle spindle 16 to seal cavity 36. Hub 42 is formed with radially-extending wheel mounting flange 52 that receives a plurality of interference-fit studs 48 (only one shown), which are used to mount a brake drum, tire rim and one or more tires (not shown) on wheel end assembly 12. Ideally, a vertical load line (not shown) of the one or more tires is located outboardly from wheel mounting flange 52 and between inboard and outboard bearings 22, 24.

In order to maintain proper lubrication and operation of inboard and outboard bearings 22, 24, a suitable amount of lubricant (not shown) is introduced into cavity 36. For example, in the prior art, a radially-oriented port 49 is formed in hub 42 between inboard and outboard bearings 22, 24. A nozzle 50 that is in fluid communication with a tank (not shown) containing semi-fluid grease is inserted into radial port 49 to pump semi-fluid grease into cavity 36. Once the proper amount of lubricant is introduced into cavity 36, a plug (not shown) is inserted into port 49 and is secured via mating threads (not shown) formed in the plug and the port. As described above, the plug may include a pipe-style interfering thread, or may include a standard thread that compresses an O-ring (not shown), which seals port 49 to prevent lubricant from exiting wheel end assembly 12.

As mentioned above, when high-strength materials are used to form hub 42, which enables the use of a thinner wall to desirably reduce the weight of the hub, there may not be enough wall thickness to form adequate threads in radially-oriented port 49 to secure the threaded plug. In addition, the formation of port 49 requires an additional manufacturing operation, which increases the cost of hub 42.

Figure 2:
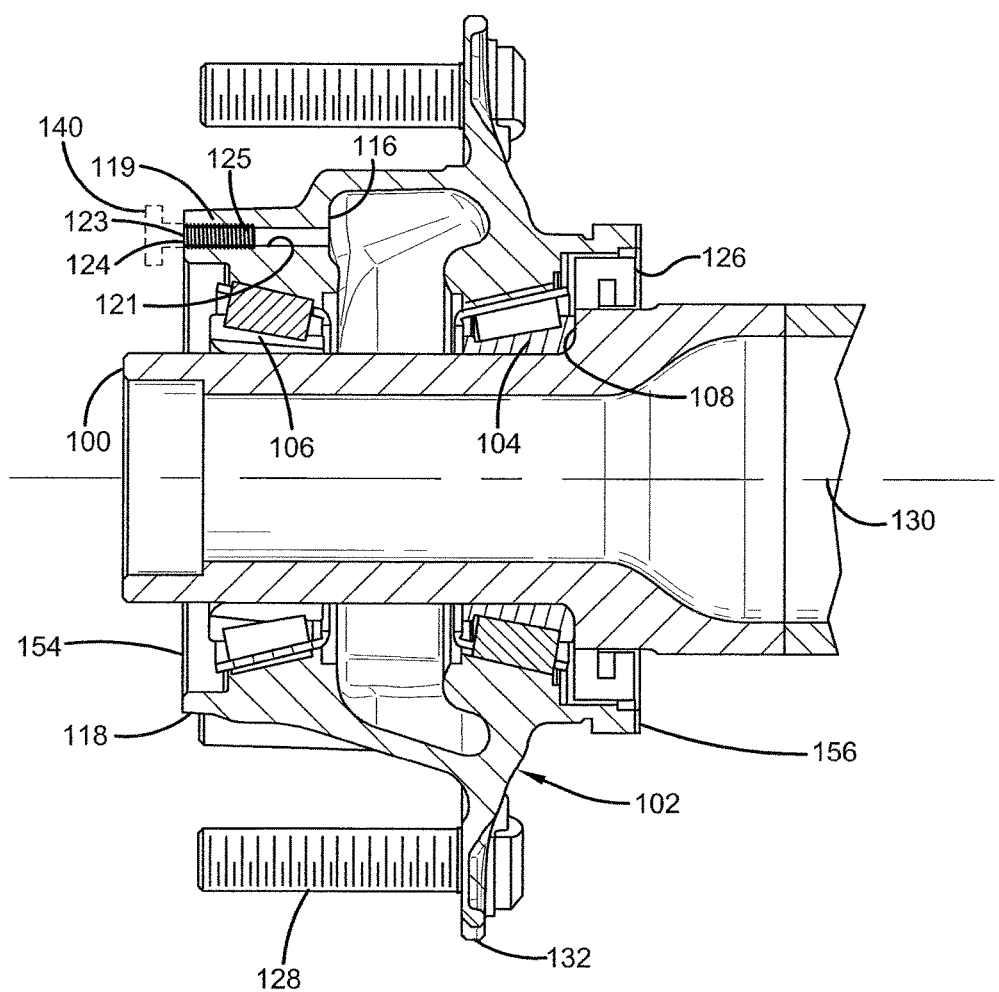
FIG. 2 is a fragmentary longitudinal cross-sectional view of a portion of a second prior art non-steerable axle and an axle spindle and wheel end assembly, including a prior art wheel hub formed with an axially-oriented lubricant fill port.

Turning now to FIG. 2, a second prior art non-drive non-steerable wheel hub 118 is shown incorporated into a non-steerable axle spindle 100 and wheel end assembly 102. Wheel hub 118 is of the type described and shown in U.S. Pat. No. 7,585,031, and assigned to the Applicant of the present invention, Hendrickson U.S.A., L.L.C. Wheel end assembly 102 includes a bearing assembly having an inboard bearing 104 and an outboard bearing 106 that are immovably mounted on the outboard end of axle spindle 100. More particularly, inboard bearing 104 is mounted on the outer diameter of axle spindle 100 and its inboard surface is in abutment with a shoulder 108 formed on the axle spindle. Outboard bearing 106 is mounted on the outer diameter of axle spindle 100 near the outboard end of the axle spindle, as known in the art.

Wheel hub 118 is rotatably mounted on inboard and outboard bearings 104, 106 in a manner well known to those skilled in the art. A cavity 116 is defined in wheel hub 118 between inboard and outboard bearings 104, 106 and axle spindle 100. A bearing spacer (not shown) optionally is disposed between bearings 104, 106 in cavity 116 to conveniently maintain proper spacing between the bearings. A nut assembly (not shown) threadably engages the outboard end of axle spindle 100 and secures bearings 104, 106, and any bearing space in place.

A hubcap (not shown) is mounted on the outboard end of hub 118 by a plurality of hubcap bolts 140 that each pass through a respective one of a plurality of openings (not shown) formed in the hubcap, and threadably engage a respective one of a plurality of aligned hubcap bolt openings 124 formed in bosses 119 of the hub. Each hubcap bolt opening 124 includes threads 123 formed therein to facilitate the threadable engagement of a respective one of a plurality of hubcap bolts 140. In this manner, the hubcap closes the outboard end of wheel end assembly 102. A main continuous seal 126 is rotatably mounted on the inboard end of wheel end assembly 102 and closes the inboard end of the assembly. More particularly, seal 126 is mounted on wheel end assembly 102 in a suitable manner and radially bridges hub 118 and axle spindle 100 to seal cavity 116. Hub 118 is formed with a radially-extending wheel mounting flange 132 that receives a plurality of threaded bolts 128, which are used to mount a brake drum, tire rim and one or more tires (not shown) on wheel end assembly 102. Ideally, a vertical load line (not shown) of the one or more tires is located outboardly from wheel mounting flange 132 and between inboard and outboard bearings 104, 106.

An axially-aligned port 121 is formed in hub 118 so that a suitable amount of semi-fluid grease (not shown) can be introduced into cavity 116, thereby maintaining proper lubrication and operation of inboard and outboard bearings 104, 106. More particularly, a selected one of hubcap bolt openings 124 is drilled deeper inboardly than the other hubcap bolt openings, and into cavity 116 to form fill port 121. In this manner, axially-oriented fill port 121 extends generally parallel to a central axis 130 of hub 118 so that a continuous opening is formed between an outboard surface 154 of the wheel hub and cavity 116. To fill wheel end assembly 102 with lubricant, a nozzle in fluid communication with a container of semi-fluid grease (not shown) is inserted into the outboard end of fill port 121 and a metered amount of semi-fluid grease is injected into hub cavity 116 via the port. Fill port 121 is tapped deep enough from its outboard end with threads 123 to allow adequate space for a threaded internal plug 125 to be installed to seal fill port 121, and for a hubcap bolt 140 to be installed outboardly of threaded internal plug 125.

The structure of fill port 121 cannot be employed with a steerable axle wheel hub due to the size and structural differences between a steerable axle wheel hub and a non-steerable axle wheel hub 118. Generally, in terms of size, a steerable axle wheel end assembly is smaller, thinner, and/or lighter than a non-steerable axle wheel end assembly, including drive-axle or non-drive axle wheel end assemblies, because of the differences in function and location where the steerable axle wheel end assembly is installed. A steerable axle wheel end assembly is installed in a relatively limited generally horizontal space near a non-steerable axle of a trailer, and in a relatively limited generally vertical space under the frame of the trailer. In addition, a steerable axle and its wheel end assembly, being distinct from a non-steerable axle and its wheel end assembly, is commonly designed to be liftable toward the frame of the trailer, so vertical space as well as horizontal space to install the steerable axle and the steerable axle wheel end assembly is limited. In terms of structure, a steerable axle wheel end assembly is different from a non-steerable axle wheel end assembly. For example, the hubcap bolt openings in many steerable axle wheel hubs do not axially align with the lubricant cavity. In addition, there are significant space constraints on a steerable axle wheel hub that limit the formation of a lubricant fill port when compared to a non-steerable axle wheel hub.

In other prior art hub designs that do not include radially-oriented port 49 (FIG. 1) or axially-oriented port 121 (FIG. 2), the hub is mounted on the inboard bearing without the outboard bearing or the nut assembly in order to enable lubricant to be pumped into the hub cavity. Once the proper amount of lubricant is introduced into the hub cavity, the outboard bearing and the nut assembly are installed. However, the lack of support at the outboard end of the hub during filling increases the possibility of the outboard end of the hub dropping onto the axle spindle, which in turn can kink or otherwise damage the main seal at the inboard end of the wheel hub.

The above-described disadvantages have created a need in the art for a structure and a method for filling a drive or non-drive steerable or non-steerable axle wheel hub of a heavy-duty wheel end assembly with semi-fluid grease. The axle wheel hub of a heavy-duty wheel end assembly with lubricant fill port of the present invention satisfies this need, as will now be described.

Figure 3:
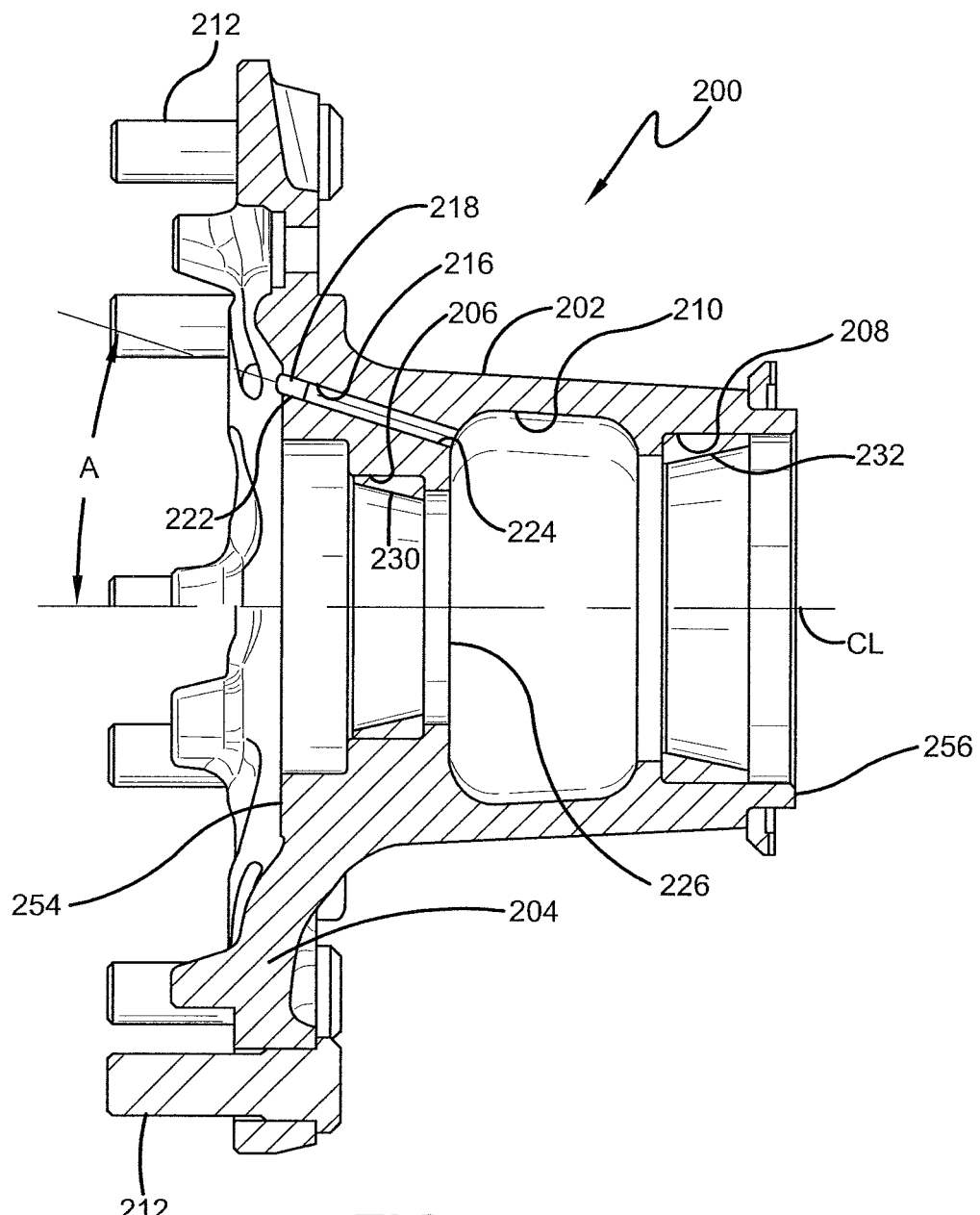
FIG. 3 is a fragmentary cross-sectional view of an exemplary embodiment of an axle wheel hub with lubricant fill port of the present invention.
Figure 4:
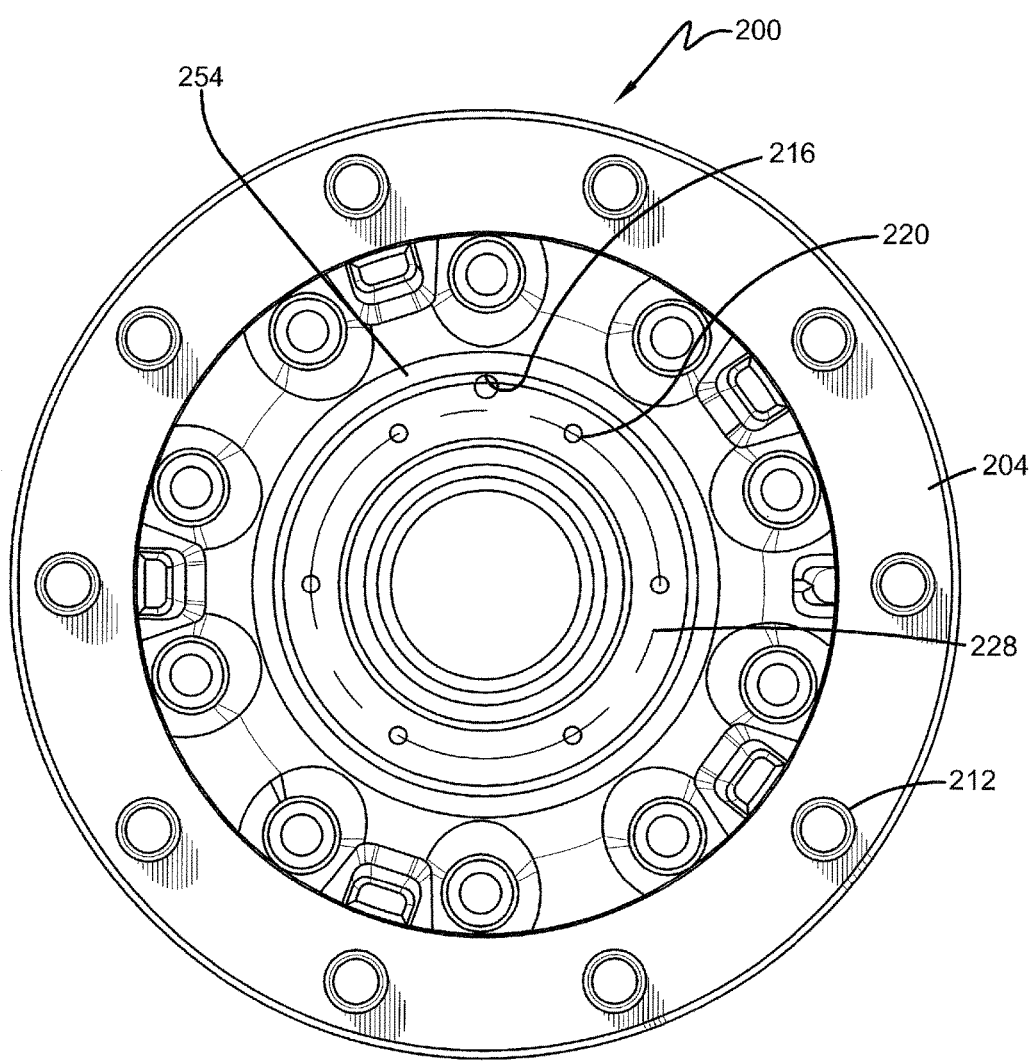
FIG. 4 is an outboard end elevational view of the axle wheel hub with lubricant fill port shown in FIG. 3.

Turning now to FIGS. 3 and 4, an exemplary embodiment of an axle wheel hub of a heavy-duty vehicle wheel end assembly with lubricant fill port of the present invention is indicated generally at 200. Wheel hub 200 includes an axially-extending wall 202 and a radially-extending wheel mounting flange 204, as known in the art. Mounting flange 204 is preferably located outboardly from a vertical load line (not shown) of one or more tires mounted on the flange 204. In a preferable case, the vertical load line is located axially between an outboard bearing 230 (only bearing cup shown) and an inboard bearing 232 (only bearing cup shown). In less preferable cases, the vertical load line may be located axially outboardly from outboard bearing 230 or axially inboardly from inboard bearing 232. An outboard bearing cavity 206 is formed in hub 200 and receives outboard bearing 230, which is installed in outboard bearing cavity 206 with an interference fit. An inboard bearing cavity 208 is also formed in hub 200 and receives inboard bearing 232, which is installed in the inboard bearing cavity with an interference fit. A lubricant cavity 210 is formed between outboard bearing cavity 206 and inboard bearing cavity 208 to retain lubricant such as semi-fluid grease (not shown) between and proximate outboard bearing 230 and inboard bearing 232. A plurality of threaded bolts 212 are used to mount a tire rim and tire (not shown) on wheel hub 200.

Hub 200 includes an outboard surface 254. A lubricant fill port 216 is formed in hub 200, and extends from hub outboard surface 254 and through an outboard wall 226 of lubricant cavity 210, thereby providing fluid communication between the outboard surface of the hub and the lubricant cavity. Lubricant fill port 216 preferably is formed by drilling or machining hub 200. An outboard end 222 of fill port 216 preferably is also formed with threads for receiving a removable plug 218 to seal the fill port and retain lubricant in lubricant cavity 210. Fill port 216 includes an inboard end 224 adjacent to and in fluid communication with lubricant cavity 210.

As best shown in FIG. 4, hub outboard surface 254 is formed with a plurality of circumferentially-spaced threaded openings 220 for receiving hubcap bolts (not shown). Hubcap bolt openings 220 form a hubcap bolt opening circle 228, and outboard end 222 of fill port 216 is disposed radially outwardly of the hubcap bolt opening circle 228. Outboard end 222 of fill port 216 preferably is disposed at a circumferential location that is between a pair of hubcap bolt openings 220 to provide clearance between the fill port and the bolt openings. Fill port 216 extends axially inboardly from its outboard end 222 to its inboard end 224, and angles radially inwardly from its outboard end to its inboard end at an angle A relative to an axial centerline CL of hub 200. Angle A preferably is between about 4 degrees and about 30 degrees relative to hub axial centerline CL, and more preferably is between about 9 degrees and about 25 degrees relative to hub axial centerline CL. By way of example, angle A is shown in FIG. 3 at about 14 degrees relative to hub axial centerline CL. Fill port 216 thus begins radially outwardly of hubcap bolt circle 228 and extends axially inboardly in hub 200 and radially inwardly past hubcap bolt circle 228 to lubricant cavity 210 at predetermined angle A.

In this manner, fill port 216 provides a structure formed in wheel hub 200 that facilitates easy lubrication of the hub with semi-fluid grease. By way of comparison, wheel hub 200 is different in structure from prior art non-drive non-steerable axle wheel hubs 42 (FIG. 1) and 118 (FIG. 2). More particularly, because the mounting surface of wheel mounting flange 204 is in axial alignment with or is outboard of hub outboard surface 254, there is less clearance on the outboard surface of wheel hub 200 than on prior art non-steerable axle wheel hubs 42 and 118.

In other words, wheel mounting flange 204 of hub 200 extends radially outwardly from generally near the outboard surface 254 of hub 200. In contrast, wheel mounting flanges 52 of hub 42 or 132 of hub 118, extend radially outwardly from between inboard surfaces 56, 156 and outboard surfaces 54, 154 respectively, of the axially extending hub wall, and the mounting surfaces of the wheel mounting flanges 52, 132 are neither in alignment with nor outboard of hub outboard surface 54, 154. Due to the different location of wheel hub mounting flange 204 of wheel hub 200, there is less clearance on outboard surface 254 of axle wheel hub 200 than on prior art non-steerable axle wheel hubs 42 and 118 for locating a lubricant fill port.

Further, wheel mounting flange 204 preferably disposed axially outboardly relative to the vertical load line of one or more tires mounted on wheel mounting flange 204 enables the vertical load line to be located axially between outboard bearing 230 and inboard bearing 232, thereby distributing the tire loads to outboard bearing 230 and inboard bearing 232.

When it applies to a steerable hub in particular, forming wheel mounting flange 204 axially near hub outboard surface 254, thereby providing an axially outwardly and radially outwardly clearance generally between wheel mounting flange 204 and the inboard surface 256 along the outer surface of hub wall 202, enables wheel hub 200 to receive steering components (not shown) such as a steering knuckle, a steering arm, etc. in the outward clearance. Of special importance is that a steerable wheel hub generally should have a smaller diameter and lighter weight than a non-steerable wheel hub as well known in the art, and therefore making a wheel hub with a thin and light axial wall helps achieve this goal. Thus, the location of lubricant fill port 216 in hub outboard surface 254, rather than in axially-extending wall 202, enables the use of a thin high-strength axially-extending wall to reduce the weight and cost of hub 200, in contrast to the heavier, thicker wall of first prior art non-steerable axle wheel hub 42. Moreover, lubricant fill port 216 enables direct fluid communication with lubricant cavity 210, in contrast to fill port 121 extending axially from the selected hubcap bolt opening 124 of second prior art non-steerable axle wheel hub 118, which might not align with the lubricant cavity in wheel hub 200.

The position and structure of lubricant fill port 216 of wheel hub 200 also enables the fill port to pass directly from hub outboard surface 254 to lubricant cavity 210 while providing clearance with outboard bearing cavity 206 and outboard bearing 230, thereby preserving the structural integrity of the hub and its associated components. More particularly, by disposing outboard end 222 of fill port 216 radially outwardly of hubcap bolt circle 228 and outboard bearing cavity 206, it preserves the structural integrity of the hub and its associated components while maintaining the structural strength of the hub. Preferably disposing fill port outboard end 222 circumferentially between a pair of hubcap bolt openings 220, also preserves the structural integrity of the hub and its associated components while maintaining the structural strength of the hub. Also, lubricant fill port 216 enables wheel hub 200 to be filled with lubricant while both inboard bearing 232 and outboard bearing 230 support the hub, thereby preventing damage to main seal 126 (FIG. 2) experienced by prior art wheel hubs that require the outboard bearing to be removed for filling.

Lubricant fill port 216 also enables economical maintenance by having a lubricant fill port separate from a hubcap bolt opening and a hubcap (not shown) as compared to prior art fill port 121 (FIG. 2). More particularly in the event that wheel hub 118 receives a strong impact, the hubcap, the selected hubcap bolt opening 124, hubcap bolt 140, plug 125 and/or hub boss 119 may be broken or damaged, potentially enabling lubricant to leak out. In addition, due to possible damage by the strong impact, the impacted hubcap, hubcap bolt 140, selected hubcap bolt opening 124 and/or opening of fill port 121 may provide deteriorated fastening or sealing between the hubcap and hub 118. Weakened bolt fastening of fill port 121 opening, in turn, may impose a disproportionate fastening burden on the other hubcap bolts 140 resulting in poor hubcap-hub fastening in general, which can be detrimental to the performance of the wheel end assembly. A strong impact on hub 118 or the hubcap also can possibly break or damage fill port 121 and cause leakage of lubricant into threads 123 of the selected hubcap bolt opening 124, which may loosen the thread engagement between hubcap bolt 140 and the threads, and between plug 125 and the threads, thereby weakening the hubcap-hub fastening. In contrast, lubricant fill port 216 of wheel hub 200 of the present invention is formed separate from hubcap bolt openings 220. Since lubricant fill port 216 has its own passageway independent from any hubcap bolt opening 220 to cavity 210, it is free from possible weakening of the hubcap-wheel hub 200 fastening caused by improper installation of the hubcap bolt or from a damaged hubcap, hubcap bolt, hub boss, and/or hubcap bolt opening by a strong impact in wheel hubs that include lubricant fill ports formed in hubcap bolt openings, such as second prior art non-steerable axle wheel hub 118 described above. Therefore, there is no risk of such undesirable effects to the performance of wheel end assembly hub 200 of the present invention in the event of a strong impact on the hubcap, hubcap bolts, hub boss, and/or hubcap bolt openings.

Wheel hub 200 thus may be easily filled or re-filled with semi-fluid grease during initial assembly of the wheel end assembly (not shown) or during field servicing of the wheel end assembly using lubricant fill port 216. To fill or re-fill wheel hub 200 with semi-fluid grease, a nozzle (not shown) that is in fluid communication with a tank or other container of semi-fluid grease is inserted into outboard end 222 of fill port 216, and a metered amount of semi-fluid grease then is injected into lubricant cavity 210. After the lubricant is injected, the nozzle is removed, and plug 218 is threaded into outboard end 222 of fill port 216 to seal the port and lubricant cavity 210.

In addition, lubricant fill port 216 of wheel hub 200 provides a visual indicator if there is leakage of semi-fluid grease. More particularly, due to the centrifugal force created when the heavy-duty vehicle travels and each respective wheel rotates, plug 218 may have a tendency to back out of lubricant fill port 216 if the plug has not been installed or re-installed properly. In first prior art non-steerable axle wheel hub 42 (FIG. 1), if the plug (not shown) backs out of radially-oriented fill port 49, centrifugal force causes semi-fluid grease to spray out of the fill port. The position of fill port 49 outboardly of wheel mounting flange 52 causes such leaked semi-fluid grease to contact the wheel surface. Because the wheel surface is readily visible, semi-fluid grease on the wheel surface is a visual indicator to the vehicle operator or a technician that the plug is missing. Likewise, in second prior art non-steerable axle wheel hub 118 (FIG. 2), if the plug (not shown) backs out of axially-oriented fill port 121, centrifugal force causes semi-fluid grease to spray out of the fill port, and the position of fill port 121 outboardly of wheel mounting flange 132 causes such leaked semi-fluid grease to contact the wheel surface. Because the wheel surface is readily visible, a visual indicator is again provided to the vehicle operator or a technician that the plug is missing.

In contrast, wheel mounting flange 204 of wheel hub 200 is in axial alignment with or is outboard of hub outboard surface 254, making it more difficult to provide a visual indicator when plug 218 is missing. For example, a radially-oriented fill port formed in axially-extending wall 202 of wheel hub 200 would be positioned behind the respective wheel, so that any leaked semi-fluid grease would not contact the wheel in an area that is readily visible to an operator or technician. However, the above-described structure of lubricant fill port 216 enables optimum positioning of the fill port to provide a visual indicator in the event that plug 218 backs out of the fill port. The axial and radial position of outboard end 222 of lubricant fill port 216 enables any leaked semi-fluid grease to emerge from the outboard end of the fill port and contact the surface of the respective wheel (not shown). Because the wheel surface is readily visible, the semi-fluid grease on the wheel surface is a visual indicator to the vehicle operator or a technician that plug 218 is missing. The operator or technician can then initiate procedures to check the amount of semi-fluid grease in wheel hub 200, thereby preserving the function and optimizing the life of bearings 230, 232.

The present invention also includes a method for introducing and filling a drive or non-drive steerable or non-steerable axle wheel hub of a heavy-duty vehicle wheel end assembly with semi-fluid grease using a lubricant fill port. The semi-fluid grease may be introduced into the axle wheel hub after the bearings are installed on the axle, which may occur during initial assembly of the wheel end assembly or during field servicing of the wheel end assembly. The method includes steps in accordance with the description that is presented above and shown in FIGS. 3-4.

It is to be understood that the structure and/or location of the above-described wheel hub 200 of a heavy-duty vehicle wheel end assembly with lubricant fill port 216 may be altered or rearranged, or certain components omitted or added, without affecting the overall concept or operation of the invention. In addition, wheel hub 200 of a heavy-duty vehicle wheel end assembly with lubricant fill port 216 of the present invention may be employed with other types of axles, wheel end assemblies, axle/suspension systems, and/or brake systems than those shown and described above, without affecting the overall concept or operation of the invention.

It is also to be understood that the present invention finds application in all types of drive or non-drive steerable or non-steerable axle wheel hubs and associated axle spindles and wheel end assemblies known to those skilled in the art, including types other than those shown and described herein, without affecting the concept or operation of the invention. Moreover, while reference herein has been made generally to a heavy-duty vehicle for the purpose of convenience, it has been with the understanding that such reference includes trucks, tractors, and trailers thereof, as well as other types of heavy-duty vehicles. Further, it is contemplated that the present invention can find application in single or dual-tire configurations, where the vertical load line is preferably disposed inboardly from the wheel mounting flange on which the tire rim(s)/tire(s) are mounted.

The present invention has been described with reference to a specific embodiment. It is understood that this description and illustration is by way of example and not by way of limitation. Potential modifications and alterations will occur to others upon a reading and understanding of this disclosure, and it is understood that the invention includes all such modifications and alterations and equivalents thereof.

Accordingly, the axle wheel hub of a heavy-duty vehicle wheel end assembly with lubricant fill port of the present invention is simplified, provides an effective, safe, inexpensive, and efficient structure which achieves all the enumerated objectives, provides for eliminating difficulties encountered with prior art wheel hubs, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the present invention is by way of example, and the scope of the present invention is not limited to the exact details shown or described.

Having now described the features, discoveries and principles of the present invention, the manner in which the axle wheel hub of a heavy-duty vehicle wheel end assembly with lubricant fill port of the present invention is constructed, arranged, and used, the characteristics of the construction and arrangement, and the advantageous, new, and useful results obtained; the new and useful structures, devices, elements, arrangements, processes, parts, and combinations are set forth in the appended claims.

What is claimed is:

1. A wheel end assembly including a wheel hub and a pair of bearings mounted on a spindle of an axle of a heavy-duty vehicle, said wheel hub being rotatably mounted on said bearings and a cavity being formed in said wheel end assembly between said bearings, the improvement comprising:
a port formed in said wheel hub for introducing semi-fluid grease into the wheel hub, said port extending axially inboardly and radially inwardly at a predetermined angle from an outboard surface of said wheel hub to said cavity, said outboard surface being substantially perpendicular to a central axis of the wheel hub, the port being in direct communication with the cavity; and
a plug disposed in the port between the cavity and said outboard surface of said wheel hub.

2. The wheel hub of claim 1, wherein an outboard end of said port is disposed circumferentially between a pair of hubcap bolt openings.

3. The wheel hub of claim 1, wherein an outboard end of said port is disposed radially outwardly of a hubcap bolt opening circle formed by hubcap bolt openings.

4. The wheel hub of claim 1, wherein said plug is removable.

5. The wheel hub of claim 1, wherein said port is tapped and said plug is formed with threads that mate with the tapped port.

6. The wheel hub of claim 1, wherein said predetermined angle is between 4 degrees and 30 degrees.

7. The wheel hub of claim 1, wherein said predetermined angle is between 9 degrees and 25 degrees.

8. A method for introducing semi-fluid grease into a wheel end assembly mounted on an axle of a heavy-duty vehicle, said method comprising the steps of:
- providing a wheel end assembly including a wheel hub and a pair of bearings mounted on a spindle of the axle, said wheel hub being rotatably mounted on said bearings, and a cavity being formed in said wheel end assembly between said bearings;
- forming a port in said wheel hub, said port extending axially inboardly and radially inwardly at a predetermined angle from an outboard surface of the wheel hub to said cavity, said outboard surface being substantially perpendicular to a central axis of said wheel hub, the port being in direct communication with the cavity;
- inserting a nozzle into said port, said nozzle being in fluid communication with a source of semi-fluid grease;
- causing said semi-fluid grease to flow through said nozzle and into said port, whereby the semi-fluid grease flows into said wheel end assembly cavity;
- terminating the flow of said semi-fluid grease when a predetermined amount of the semi-fluid grease has been introduced into said wheel end assembly; and
- disposing a plug in said port after the flow of said semi-fluid grease has been terminated.

9. The method for introducing semi-fluid grease into said wheel end assembly of claim 8, wherein an outboard end of said port is disposed circumferentially between a pair of hubcap bolt openings.

10. The method for introducing semi-fluid grease into said wheel end assembly of claim 8, wherein an outboard end of said port is disposed radially outwardly of a hubcap bolt opening circle formed by hubcap bolt openings.

11. The method for introducing semi-fluid grease into said wheel end assembly of claim 8, wherein the plug is removable.

12. The method for introducing semi-fluid grease into said wheel end assembly of claim 8, wherein the port is tapped and the plug is formed with threads that mate with the tapped port.

13. The method for introducing semi-fluid grease into said wheel end assembly of claim 8, wherein the predetermined angle is between 4 degrees and 30 degrees.

14. The method for introducing semi-fluid grease into said wheel end assembly of claim 8, wherein the predetermined angle is between 9 degrees and 25 degrees.

* * * * *